United States Patent

[11] 3,572,669

[72] Inventor Daniel Brand
 5207 S. Oxford, Tulsa, Okla. 74135
[21] Appl. No. 753,519
[22] Filed Aug. 19, 1968
[45] Patented Mar. 30, 1971

[54] PIPE BEVELING MACHINE
 4 Claims, 10 Drawing Figs.
[52] U.S. Cl. ................................................. 266/23
[51] Int. Cl. .................................................. B23k 7/06,
 B23k 7/10
[50] Field of Search ........................................... 266/230, 23
 (N); 33/21 (C), 21 (A)

[56] References Cited
 UNITED STATES PATENTS
1,852,413 4/1932 Hickey ........................ 266/23(N)
2,155,705 4/1939 Gottwald ..................... (3B/21C)UX
2,408,517 10/1946 Howard ....................... 266/23(O)X
2,843,373 7/1958 Livers .......................... 266/23(O)
2,851,265 9/1958 Cink ............................ 266/23(O)

Primary Examiner—J. Spencer Overholser
Assistant Examiner—John E. Roethel
Attorney—Fishburn, Gold and Litman ABSTRACT: A pipe beveling machine travels around a track on an elongate band secured in encircling relation on a pipe to be cut adjacent the line of cut. The machine moves through engagement of a rotatable member with an endless flexible member encircling the pipe. A cutting torch is adjustably mounted on a bracket extending outwardly from a carriage which pivotally supports a platform having drive means thereon turning the rotatable member operatively engaged with the endless flexible member.

Patented March 30, 1971
3,572,669
4 Sheets-Sheet 1
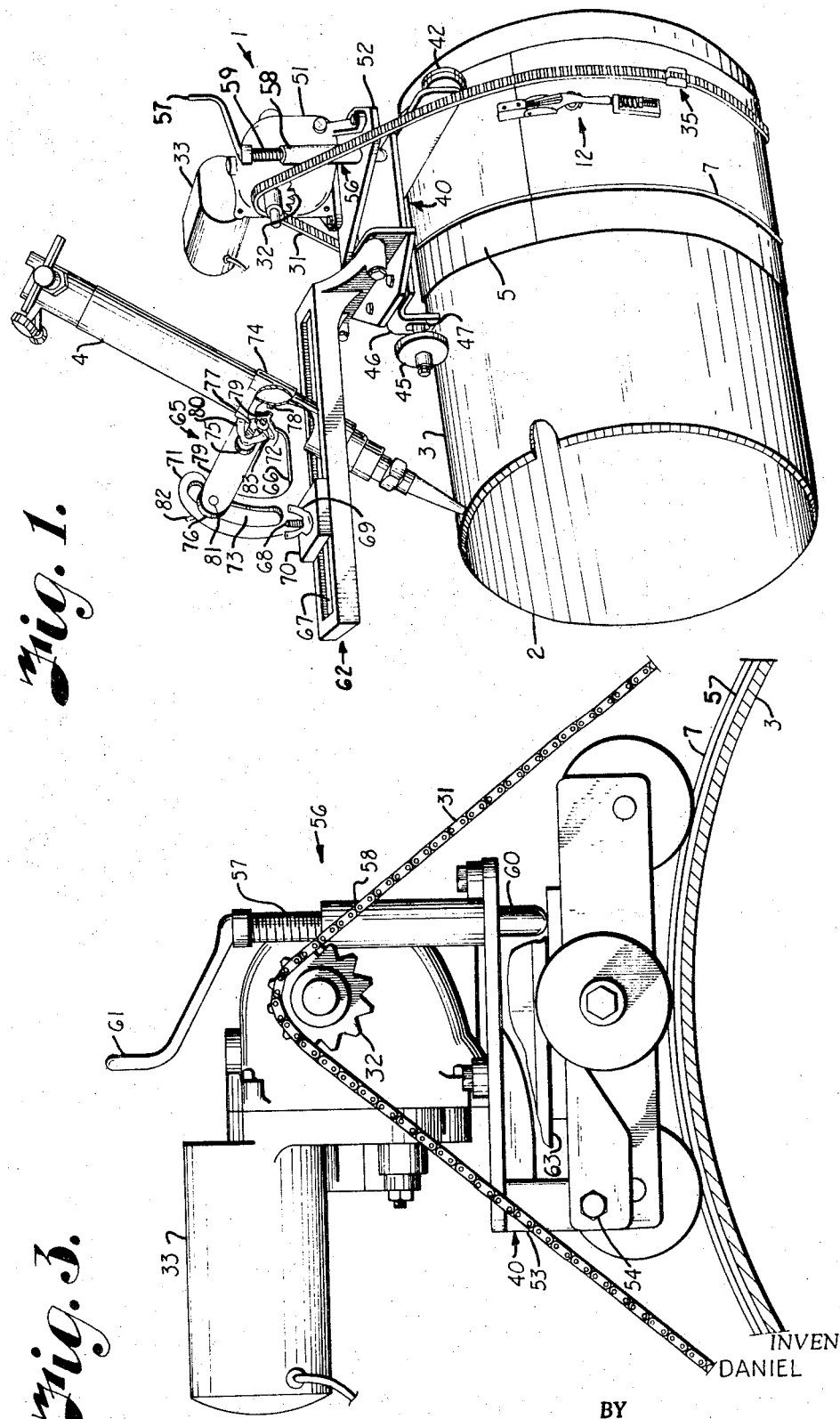
INVENTOR.
DANIEL BRAND
BY
Fishburn, Gold & Litman
ATTORNEYS

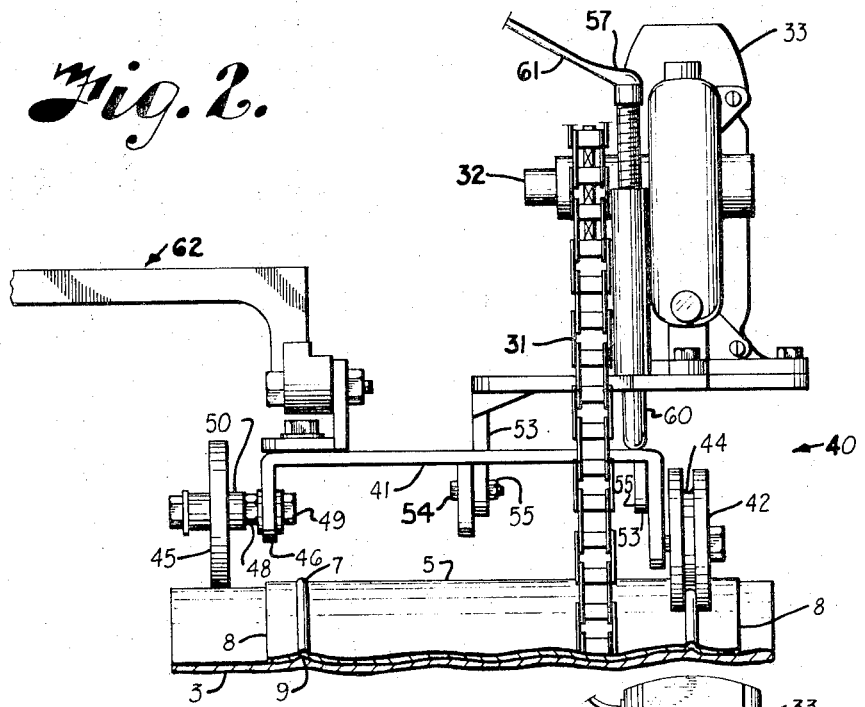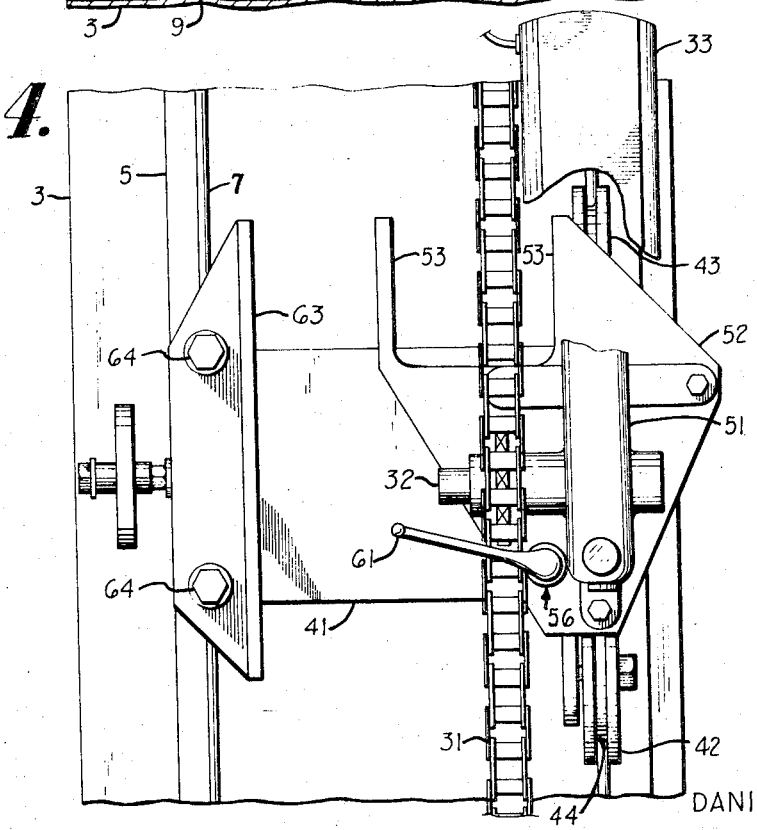

Patented March 30, 1971

INVENTOR.
DANIEL BRAND
BY
ATTORNEYS

Patented March 30, 1971
3,572,669
4 Sheets-Sheet 4
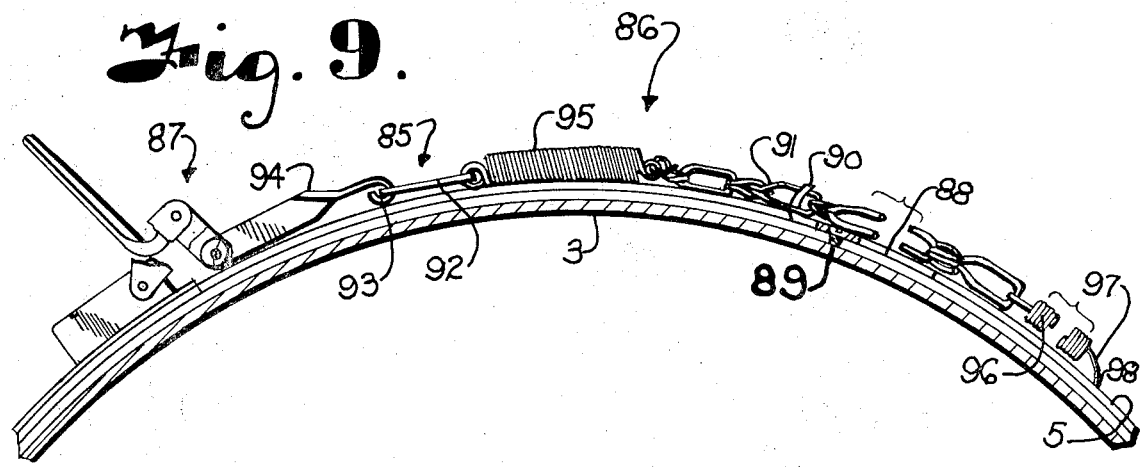
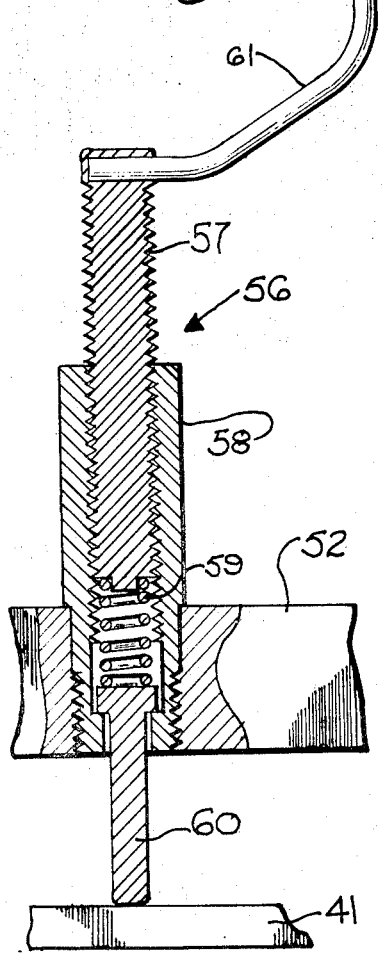
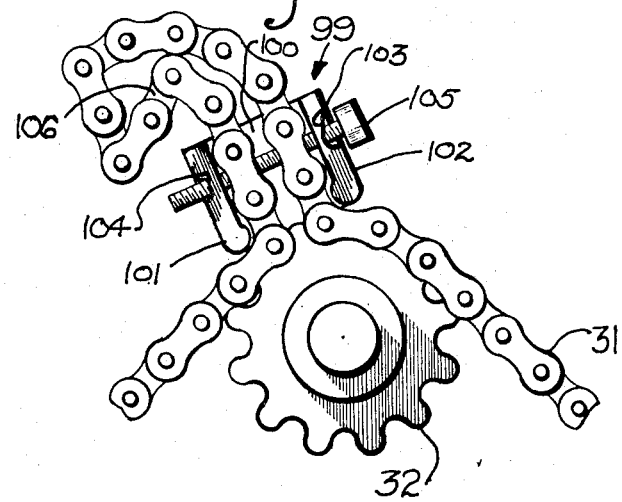
INVENTOR.
DANIEL BRAND
BY
Fishburn, Gold & Litman
ATTORNEY'S

PIPE BEVELING MACHINE

This invention relates generally to a machine for cutting metal pipe and more specifically to a pipe beveling machine for cutting a conical bevel edge transversely of large diameter metal pipe by means of a cutting torch adjustably mounted on the machine.

The principal objects of the present invention are: to provide an improved, new, lightweight, compact, accurate and durable pipe beveling machine for accurately transversely cutting large diameter metal pipe and providing a desired conical bevel edge thereon; to provide a novel carriage movable around a flexible interengageable band and track surrounding a metal pipe for supporting a tip of a cutting torch at an optimum distance and angle relative to an exterior surface of the metal pipe to be cut during movement therearound; to provide such a band and track which is adapted to encircle a large range of pipe sizes and conform to the exterior contour thereof for mounting and guiding a cutting torch carrier through 360° therearound during the pipe cutting operation; to provide a carriage having adjustably supported drive means adapted for positive engagement with an endless flexible member encircling the band for moving the cutting torch through 360° around the pipe; to provide such a carriage having tandem circumferentially spaced guide wheels engageable with the track and a support wheel laterally spaced from the guide wheels whereby the cutting torch moves around the pipe to be cut at an optimum distance and angle; and to provide such a pipe beveling machine which is adapted for use at either end of the pipe and which is simple in construction and operation and economically manufactured.

Other objects and advantages of this invention will become apparent from the following description taken in connection with the accompanying drawings wherein are set forth by way of illustration and example certain embodiments of this invention.

FIG. 1 is a perspective view of a pipe beveling machine embodying features of the present invention in place on a metal pipe to be cut.

FIG. 2 is a side elevational view of the pipe beveling machine.

FIG. 3 is a front elevational view of the pipe beveling machine.

FIG. 4 is a plan view of the pipe beveling machine.

FIG. 8 is a sectional view through an adjustment device.

FIG. 9 is an elevational view of a modified form of band clamping device.

FIG. 10 is an enlarged perspective view of a coupler for the endless flexible member.

Figure 5:
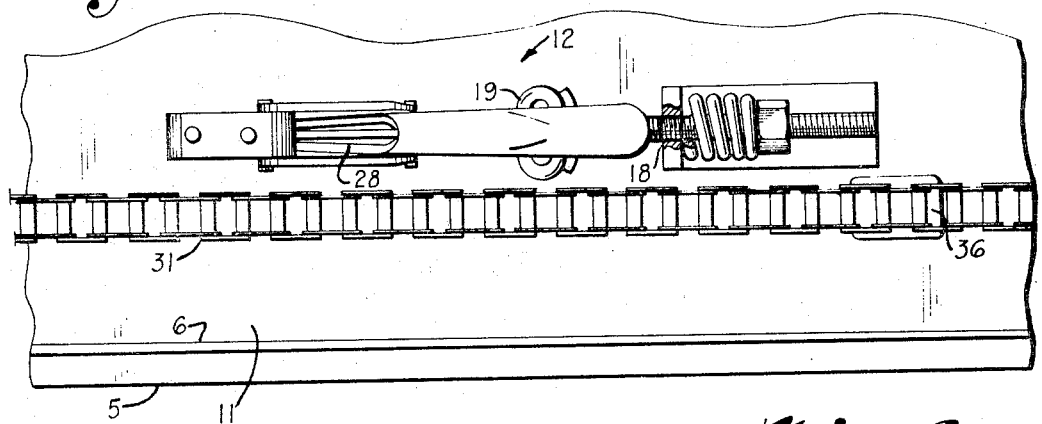
FIG. 5 is a plan view of an adjustable band clamping device in a closed position.
Figure 6:
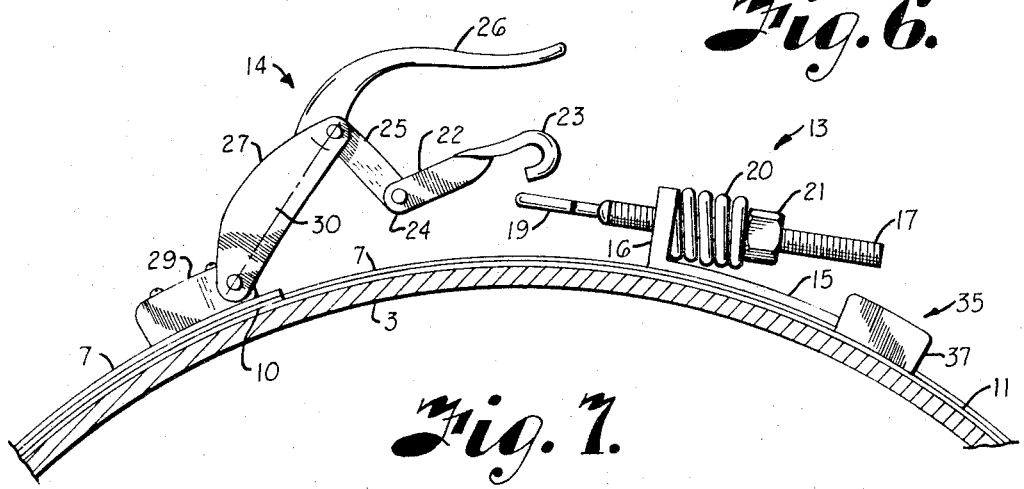
FIG. 6 is an elevational view of the adjustable band clamping device in an open position.
Figure 7:
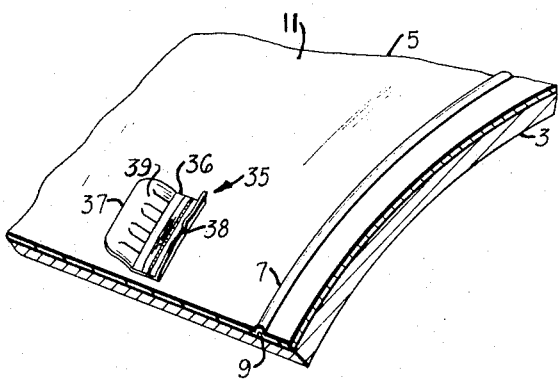
FIG. 7 is an enlarged perspective view of a band engaging the pipe showing a guide clip for an endless flexible member encircling the pipe.

Referring more in detail to the drawings:

The reference numeral 1 generally designates a pipe beveling machine for cutting a conical bevel edge 2 transversely of large diameter metal pipe 3 by means of a cutting torch 4 mounted on the machine 1.

The pipe beveling machine 1 travels circumferentially around the metal pipe 3 on an elongate band 5 encircling the metal pipe 3 which has an elongate track 6 extending longitudinally between opposite ends of the band 5. In the illustrated structure, the track 6 consists of an upwardly and outwardly extending rib 7 parallel with opposite edges 8 of the band 5 and extending longitudinally between opposite ends thereof. The rib 7 has an internal recess 9 extending upwardly into the rib 7 from a lower or interior surface 10 whereby opposite ends of the band 5 overlap and effect a cooperative interengagement between the rib 7 on an upper or exterior surface 11 and the recess 9 in the lower or interior surface 10 thereby circumferentially aligning the track 6.

A clamping device 12 is operative to secure the band 5 in tight engagement with the exterior surface of the pipe 3. The clamping device 12 has an adjustable portion 13 mounted on one end of the band 5 and a clamping portion 14 mounted on the other end of the band 5. The adjustable portion 13 includes a bracket 15 having an upturned finger 16 adjacent the one end of the band 5. An elongate threaded shaft 17 extends through a threaded bore 18 in the upturned finger 16 and has a loop portion 19 on one end thereof. A suitable resilient member, such as a helical compression spring 20, is sleeved on the threaded shaft 17 and has opposite ends engaging the finger 16 and a nut 21 mounted on the shaft 17 respectively.

The clamping portion 14 includes a hook link 22 having a suitable hook 23 on one end thereof which is adapted to interengage with the loop portion 19 and be retained therein. The other end 24 of the hook link 22 is pivotally connected to one end of a closing lever 25 which has a handle portion 26 at an other end thereof. The closing lever 25 is pivotally mounted on a bell crank 27 intermediate the ends of the closing lever 25 whereby when the closing lever 25 is raised upwardly and outwardly from the band 5, the hook end 23 of the hook link 22 is moved outwardly from the clamping portion 14 and when the handle portion 26 of the closing lever 25 is moved toward the band 5, the hook end 23 of the hook link 22 is withdrawn toward the clamping portion 14. The bell crank 27 has a recess 28 therein adapted to receive the other end 24 of the hook link 22 and the one end of the closing lever 25 therein when the handle portion 26 of the closing lever 25 is moved toward the band 5. The other end of the bell crank 27 is pivotally mounted on an upstanding rib 29 suitably secured to the elongate band 5, as by flat head machine screws 29'.

The pivotal connections at the opposite ends of the bell crank 27 form an axis 30 beyond which the other end 24 of the hook link 22 moves when the handle portion 26 is moved toward the band 5, thereby providing a positive clamping action between the adjustable portion 13 and the clamping portion 14, and which requires positive upward pressure on the handle portion 26 to move the other end 24 of the hook link 22 across the axis 30.

The pipe beveling machine 1 travels around the band 5 through engagement with an endless flexible member 31 which encircles the pipe 3. In the illustrated structure, the endless flexible member 31 engages a suitable drive member, such as a drive sprocket 32 which is operatively connected to a suitable drive means, such as an electric motor 33, for moving the machine circumferentially around the pipe 3. The endless flexible member 31 is illustrated as a chain having a diameter substantially greater than the diameter of the pipe 3 and band 5.

It is desirable to position and guide the chain 31 by maintaining the position thereof relative to the opposite edges 8 of the band 5, therefore a plurality of guide members or clips 35 are circumferentially spaced around the band 5 and are adapted to guide the chain 31 while the beveling machine 1 is traveling around the band 5 and pipe 3. In the illustrated structure, the guide members 35 each include an elongate web portion 36 mounted in engagement with the upper or exterior surface 11 and each includes flanges 37 and 38 extending upwardly from opposite edges of the web portion 36.

Each of the clips 35 has a plurality of serrations 39 in each of the flanges 37 and 38 to be engaged by the chain 31 whereby the chain 31 is substantially prevented from slipping around the band 5. The clips 35 are each suitably secured to the band, as by welding, whereby the chain 31 is guided into proper position relative to opposite edges of the band 5.

The pipe beveling machine 1 is mounted on a carriage 40 having an elongate carriage frame 41 rotatably supporting circumferentially spaced tandem wheels 42 and 43 which are adapted to engage and travel along the track 6. In the illustrated structure, the tandem wheels 42 and 43 each have grooved rims 44 adapted to engage the rib 7. Laterally spaced from the tandem wheels 42 and 43 is a support wheel 45 which engages the exterior surface of the pipe 3.

It is desirable that the support wheel 45 be adjustable vertically to maintain the chain 31 in position, maintain the carriage frame 41 substantially parallel with the exterior surface of the pipe 3, and to assist in positioning the cutting torch 4 relative to the exterior surface of the metal pipe 3 whereby the chain 31 will not move laterally of the band 5 and will remain aligned with the clips 35 while the machine 1 travels around the pipe 3. In the illustrated structure, the carriage 40 includes a depending finger 46 having a vertical slotted opening 47 therein for receiving an axle 48 having the support wheel 45 mounted thereon. The portion of the axle 48 extending through the slotted opening 47 is threaded to receive a nut 49 which when tightened effects a clamping engagement between the depending finger 46, the nut 49, and a suitable shoulder portion 50 on the axle 48.

The electric motor 33 and a suitable gear reduction unit 51 are mounted on a drive platform 52 which is pivotally mounted on the carriage 40. In the illustrated structure, one end of the drive platform 52 has laterally spaced depending ears 53 each having pins 54 extending through lower ends thereof with the pins 54 being suitably engaged as by nuts 55 to effect a clamping engagement between the ears 53 and the carriage 40.

An adjustment device 56 is mounted on the other end of the drive platform 52 and is operative to adjust the spacing between the carriage 40 and the platform 52 to thereby adjust the tension in the chain 31. In the illustrated structure, a crank member 57 has one end threadedly engaged within a sleeve 58 and a suitable resilient member, such as a spring 59 mounted thereon. An upper portion of the sleeve 58 is internally threaded to receive and engage threads on an elongate shaft of the crank member 57. The spring 59 engages a plunger 60 which is movable within the lower portion of the sleeve 58. The plunger 60 extends through the drive platform 52 to engage the carriage 40 whereby the drive platform 52 may be raised and lowered relative to the carriage 40. A handle portion 61 is mounted on the other end of the threaded crank member 57 and is operative to rotate same within the sleeve 58 thereby moving the plunger 60 relative to the drive platform 52 whereby the spacing between the carriage 40 and the drive platform 52 is adjustable to maintain a selected tension on the chain 31 in its engagement with the drive sprocket 32.

In cutting the edges of the metal pipe 3 with the cutting torch 4, it is important to control both the radial distance from the exterior surface of the pipe 3 of the tip of the cutting torch 4 and the angular position of the cutting torch 4 relative to the longitudinal axis thereof. The cutting torch 4 is therefore adjustably mounted on a torch rack 62 which cantilevers outwardly from the carriage 40 and in the illustrated structure, one end of the torch rack 62 is suitably secured to a bracket 63 mounted on the carriage 40, as by a plurality of bolts 64. The torch rack 62 is thereby spaced radially outwardly from the exterior surface of the pipe 3 and extends outwardly from the bracket 63 in a position substantially parallel with the exterior surface of the pipe 3.

An adjustable torch holding member 65 is movably mounted on the torch rack 62 for longitudinal movement of the torch 4 therealong for positioning the cutting torch 4 in a selected spaced relation with the pipe 3. In the illustrated structure, an elongate base 66 is slidably received within an elongate slot 67 in the torch rack 62 and the base 66 may be held in position relative to the torch rack 62 by a suitable fastening device, such as a bolt 68, for providing clamping engagement between the base 66 and the torch rack 62. A wing nut 69 is threadedly mounted on one end of the bolt 68 and a plate 70 is mounted on the other end thereof and adapted to engage a lower surface of the torch rack 62. The base 66 includes front and rear upstanding arms 71 and 72 respectively for positioning the cutting torch 4 through engagement with the torch holding member 65. The front upstanding arm 71 extends upwardly from the base 66 and is arcuately curved toward the carriage 40 and has an elongate arcuate slot 73 therein.

The torch holding member 65 includes a sleeve portion 74 for receiving and clampingly engaging the cutting torch 4 therein. In the illustrated structure, the sleeve portion 74 has outstanding ears 75 and 76 having a suitable fastening device, such as a bolt 77 extending therethrough and adapted to tighten the sleeve portion 74 around the cutting torch 4. The sleeve portion 74 also, includes a threaded stub shaft 78 adapted to extend through a bore 79 in the rear upstanding arm 72 and be engaged by a suitable nut, such as a wing nut (not shown) to hold the sleeve portion 74 in a selected position. One of the ears, as for example ear 76, extends outwardly from the sleeve portion 74 and has a stub shaft 81 extending through the arcuate slot 73 and moveable therealong to adjust the angle of the cutting torch 4 relative to the longitudinal axis of the pipe 3. The stub shaft 81 is threaded and a wing nut 82 engages the threaded stub shaft 81 and provides a clamping engagement between the front upstanding arm 71 and the outstanding ear 76.

In operation, the elongate band 5 is placed around the metal pipe 3 and opposite ends thereof are interengaged by the rib 7 on one end being received in the recess 9 on the other end thereby aligning the track 6. The elongate threaded shaft 17 is adjusted to provide a tight engagement between the band 5 and the pipe 3. The clamping portion 14 is engaged with the loop portion 19 of the shaft 17 thereby securing the tight engagement between the pipe and band. The pipe beveling machine 1 is placed on the track 6 with the grooved rims 44 of the tandem wheels 42 and 43 engaging the rib 7. The crank member 57 is adjusted to provide a desired tension in the chain 31 after same is engaged with the sprocket 32. The torch holding member 65 is adjusted to position the point or tip of the cutting torch 4 at a desired radial position relative to the exterior surface of the pipe and at a desired angle relative to the longitudinal axis of the pipe whereby the torch 4 cuts the desired conical bevel edge 2 as the motor 33 rotates the drive sprocket 32 to move the machine 1 circumferentially around the pipe being cut.

FIG. 9 illustrates a modified form of a band clamping device 85 which is operative to secure the band 5 in tight engagement with the exterior surface of the pipe 3. The clamping device 85 has an adjustable portion 87 engageable with a keeper 88 suitably mounted on the other end of the band 5, as by flat head machine screws 89. The keeper 88 has a hook portion 90 adapted to be engaged by a link of a chain 91, as later described.

The clamping portion 87 includes a ring 92 enclosed within a hook portion 93 on one end of a hook link 94 of the clamping portion 87. One end of a suitable resilient member, such as a helical tension spring 95, is mounted on the ring 92 and one end of the chain 91 is mounted on the other end of the helical tension spring 95. It is desirable to restrain the other end of the chain 91 to prevent same from interfering with the drive chain 31, therefore the free end or other end of the chain 91 has a spring 96 mounted thereon and adapted to engage the band 5 to position and restrain the free or other end of chain 91. In the illustrated structure, the spring 96 has one end mounted on the free end of the chain 91 and the other end has a hook portion 97 adapted to be inserted in one of a plurality of openings in the band 5 as at 98.

The modified band clamping device 85 permits use of the band 5 and machine 1 on a wide range of pipe sizes, as for example between 24-inch diameter pipe to 30-inch diameter pipe.

In use a selected link of the chain 91 is engaged on the hook portion 90 of the keeper 88 and the clamping portion 87 is operated as previously described to adjust the clamping device 85 to the pipe 3 to be cut. The hook portion 97 of the spring 96 is engaged in one of the openings 98 to position the free end of the chain 91 in a position which will not interfere with the drive chain 31.

FIG. 10 illustrates a chain coupler 99 which may be installed on the chain 31 to reduce the diameter thereof whereby a chain 31 having a length adapted for use on a standard size pipe may have the length thereof adjusted to permit mounting the machine 1 on nonstandard size pipe. The chain coupler 99 is illustrated as a channel member having a web portion 100 and flanges 101 and 102 extending outwardly from opposite edges of the web portion 100. One flange has a threaded bore 103 extending therethrough and the other flange has a plain bore 104 extending therethrough which is aligned with the threaded bore 103 whereby a screw 105 may be mounted in the coupler 99.

To install the coupler 99 on the chain 31, a loop or bight 106 is formed in the chain 31 and the screw 105 is inserted through links in the chain 31 forming the loop or bight 106. The coupler 99 is operative to position the links of the chain 31 in a position to be engaged by the sprocket 32 whereby the machine 1 may travel circumferentially around the pipe 3 as if there were no loop or bight 106 formed in the chain 31.

It is to be understood that while I have illustrated and described certain forms of my invention, it is not to be limited to these specific forms or arrangement of parts herein described and shown except insofar as such limitations are included in the claims.

I claim:

1. A pipe beveling apparatus comprising:
    a. an elongate band encircling a pipe, said band having an elongate track extending longitudinally between opposite ends of said band and circumferentially of the pipe, said band having overlapping ends;
    b. said track being a rib extending upwardly from an upper surface of said band and said rib having an upwardly directed recess extending thereinto from the lower surface of said band whereby said upwardly extending rib on one end of said band interengages with said inwardly directed recess on the other end of said band thereby circumferentially aligning said track;
    c. means connected to the band and operative to draw same into clamping engagement with said pipe with said track extending continuously circumferentially around the pipe;
    d. a carriage having wheel means for rolling movement circumferentially around said pipe;
    e. said wheel means including a pair of tandem circumferentially spaced rotatably mounted wheels each having grooved rims for engaging said rib, and a rotatably mounted support wheel spaced laterally of said tandem wheels;
    f. an endless flexible member encircling said band;
    g. power means mounted on said carriage and having a driven member with said flexible member extending over and engaging same, means tensioning said flexible member around the band driven member, said power means being operative to rotate said driven member and drive said carriage around said pipe through engagement with said flexible member; and
    h. torch supporting means mounted on said carriage for positioning a cutting torch at a uniform radial distance outwardly from the exterior of said pipe and at an angular position relative to the longitudinal axis of said pipe.

2. The pipe beveling apparatus as set forth in claim 1 wherein said carriage includes:
    a. an elongate frame having said tandem wheels and said support wheel rotatably mounted thereon,
    b. an elongate platform having one end adjustably mounted on said frame; and
    c. an adjustment device mounted on the other end of said platform and having a movable plunger with one end engaged with said frame operative to position said platform selected angular relation with said frame.

3. Apparatus for beveling ends of metal pipe, said apparatus comprising:
    a. an elongate band encircling a pipe, said band having a plurality of laterally spaced longitudinal ribs extending upwardly from an exterior surface of said band with each rib having a recess extending upwardly into said respective rib from an interior surface of said band, said band having overlapping ends whereby said ribs interengage with respective recesses thereby forming circumferentially aligned tracks encircling said band and said pipe;
    b. a clamping device having a first portion mounted on one end of said band and a second portion mounted on the other end of said band, said first portion of said clamping device being adjustable and interengageable with said second portion to effect clamping engagement between said band and said pipe;
    c. a carriage having an elongate frame with circumferentially spaced rotatably mounted tandem wheels each having grooved rims for engaging one of said ribs, said carriage frame having at least one rotatably mounted support wheel laterally spaced from said tandem wheels,
    d. an endless chain having a diameter substantially greater than the diameter of said band, said chain encircling said band;
    e. a plurality of circumferentially spaced guide members mounted on said band for positioning said chain relative to opposed edges of said band;
    f. power means mounted on said carriage and engageable with said chain, said power means being operative to drive said carriage around said pipe through engagement with said chain, said power means having a drive shaft extending outwardly therefrom, said drive shaft having a drive sprocket wheel mounted on said shaft, said sprocket wheel engaging said chain whereby said carriage travels circumferentially around said band; and
    g. a torch rack mounted on said carriage frame for positioning a cutting torch at a uniform radial distance outwardly from the exterior of said pipe, said torch rack having a pivotally mounted torch holding member and fastening means for securing said torch holding member at a selected angular position relative to the longitudinal axis of said pipe whereby an angle of bevel is adjustable.

4. The machine for beveling ends of metal pipe as set forth in claim 3 including:
    a. an elongate platform having one end pivotally mounted on said carriage frame;
    b. an internally threaded sleeve extending upwardly from said platform at the other end thereof, said sleeve having an elongate shaft threadedly engaged therein with one end of said shaft engageable with a plunger, said plunger being engageable with said carriage frame; and
    c. a handle mounted on the other end of said shaft for rotating said shaft in said sleeve whereby tension is adjusted in said chain by rotating said handle thereby adjusting the position of said sprocket wheel relative to said carriage frame.